US007032226B1

(12) United States Patent
Nemirovsky et al.

(10) Patent No.: US 7,032,226 B1
(45) Date of Patent: Apr. 18, 2006

(54) METHODS AND APPARATUS FOR MANAGING A BUFFER OF EVENTS IN THE BACKGROUND

(75) Inventors: Mario Nemirovsky, Saratoga, CA (US); Narendra Sankar, Santa Clara, CA (US); Adolfo Nemirovsky, San Jose, CA (US); Enric Musoll, San Jose, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 434 days.

(21) Appl. No.: 09/608,750

(22) Filed: Jun. 30, 2000

(51) Int. Cl.
*G06F 9/46* (2006.01)

(52) U.S. Cl. ............... 719/318; 719/313; 719/314; 719/315; 719/316; 719/317; 718/103; 718/104; 718/106; 718/107; 710/22; 709/213; 711/147

(58) Field of Classification Search ............ 710/20–27, 710/1–74; 719/313–318; 709/201–250; 718/103, 104, 106, 107; 711/101–173
See application file for complete search history.

(56) References Cited

U.S. PATENT DOCUMENTS

| 4,200,927 | A | | 4/1980 | Hughes et al. |
| 4,707,784 | A | | 11/1987 | Ryan et al. |
| 4,942,518 | A | | 7/1990 | Weatherford et al. |
| 5,023,776 | A | | 6/1991 | Gregor |
| 5,121,383 | A | | 6/1992 | Golestani |
| 5,291,481 | A | | 3/1994 | Doshi et al. |
| 5,408,464 | A | | 4/1995 | Jurkevich |
| 5,465,331 | A | | 11/1995 | Yang et al. |
| 5,471,598 | A | | 11/1995 | Quattromani et al. |
| 5,521,916 | A | | 5/1996 | Choudhury et al. |
| 5,559,970 | A | | 9/1996 | Sharma |
| 5,619,497 | A | | 4/1997 | Gallagher et al. |
| 5,634,015 | A | * | 5/1997 | Chang et al. ............... 710/310 |
| 5,659,797 | A | | 8/1997 | Zandveld et al. |
| 5,708,814 | A | * | 1/1998 | Short et al. ................. 710/260 |
| 5,724,565 | A | | 3/1998 | Dubey et al. |
| 5,737,525 | A | | 4/1998 | Picazo et al. |

(Continued)

FOREIGN PATENT DOCUMENTS

WO    WO 03/005645 A2    6/2002

OTHER PUBLICATIONS

Knuth, Donald E., "The Art of Computer Programming, Third Edition, vol. 1, Fundamental Algorithms", "Sec. 2.5 Dynamic Storage Allocation", 1997, pp 435-456, Addison-Wesley, US.

(Continued)

*Primary Examiner*—Meng-Al T. An
*Assistant Examiner*—Charles Anya
(74) *Attorney, Agent, or Firm*—Donald R. Boys; James W. Huffman

(57) ABSTRACT

A background event buffer manager (BEBM) for ordering and accounting for events in a data processing system having a processor includes a port for receiving event identifications (IDs) from a device, a queuing function enabled for queuing event IDs received, and a notification function for notifying the processor of queued event IDs. The BEBM handles all event ordering and accounting for the processor. The BEBM in preferred embodiments queues events by type with priority and by priority within type, and also handles sending acknowledgement to the device when processing on each event is concluded, and buffers the acknowledgement process. In particular embodiments the apparatus and method is taught as a packet processing router engine.

24 Claims, 5 Drawing Sheets

U.S. PATENT DOCUMENTS

| | | | |
|---|---|---|---|
| 5,784,649 | A | 7/1998 | Begur et al. |
| 5,784,699 | A | 7/1998 | McMahon et al. |
| 5,796,966 | A | 8/1998 | Simcoe et al. |
| 5,809,321 | A | 9/1998 | Hansen et al. |
| 5,812,810 | A | 9/1998 | Sager |
| 5,892,966 | A | 4/1999 | Petrick et al. |
| 5,918,050 | A | 6/1999 | Rosenthal et al. |
| 5,978,570 | A | 11/1999 | Hillis |
| 5,978,893 | A | 11/1999 | Bakshi et al. |
| 5,987,578 | A | 11/1999 | Butcher |
| 6,009,516 | A | 12/1999 | Steiss et al. |
| 6,016,308 | A | 1/2000 | Crayford et al. |
| 6,023,738 | A | 2/2000 | Priem et al. |
| 6,047,122 | A | 4/2000 | Spiller |
| 6,070,202 | A | 5/2000 | Minkoff et al. |
| 6,073,251 | A | 6/2000 | Jewett et al. |
| 6,088,745 | A | 7/2000 | Bertagna et al. |
| 6,131,163 | A | 10/2000 | Wiegel |
| 6,151,644 | A | 11/2000 | Wu |
| 6,157,955 | A | 12/2000 | Narad et al. |
| 6,169,745 | B1 | 1/2001 | Liu et al. |
| 6,219,339 | B1 | 4/2001 | Doshi et al. |
| 6,219,783 | B1 | 4/2001 | Zahir et al. |
| 6,223,274 | B1 | 4/2001 | Catthoor et al. |
| 6,226,680 | B1 | 5/2001 | Boucher et al. |
| 6,247,105 | B1 | 6/2001 | Goldstein et al. |
| 6,249,801 | B1 | 6/2001 | Zisapel et al. |
| 6,253,313 | B1 | 6/2001 | Morrison et al. |
| 6,263,452 | B1 | 7/2001 | Jewett et al. |
| 6,381,242 | B1 | 4/2002 | Maher, III et al. |
| 6,438,135 | B1 | 8/2002 | Tzeng |
| 6,453,360 | B1 | 9/2002 | Muller et al. |
| 6,460,105 | B1 * | 10/2002 | Jones et al. ................ 710/268 |
| 6,483,804 | B1 | 11/2002 | Muller et al. |
| 6,502,213 | B1 | 12/2002 | Bowman-Amuah |
| 6,523,109 | B1 | 2/2003 | Meier |
| 6,529,515 | B1 | 3/2003 | Raz et al. |
| 6,535,905 | B1 | 3/2003 | Kalafatis et al. |
| 6,614,796 | B1 | 9/2003 | Black et al. |
| 6,625,808 | B1 | 9/2003 | Tarditi |
| 6,640,248 | B1 | 10/2003 | Jorgensen |
| 6,738,371 | B1 | 5/2004 | Ayres |
| 6,738,378 | B1 | 5/2004 | Tuck, III et al. |
| 6,813,268 | B1 | 11/2004 | Kalkunte et al. |
| 2001/0004755 | A1 | 6/2001 | Levy et al. |
| 2001/0005253 | A1 | 6/2001 | Komatsu |
| 2001/0024456 | A1 | 9/2001 | Zaun et al. |
| 2001/0043610 | A1 | 11/2001 | Nemirovsky et al. |
| 2001/0052053 | A1 | 12/2001 | Nemirovsky et al. |
| 2002/0016883 | A1 | 2/2002 | Musoll et al. |
| 2002/0049964 | A1 | 4/2002 | Takayama et al. |
| 2002/0054603 | A1 | 5/2002 | Mussoll et al. |
| 2002/0071393 | A1 | 6/2002 | Musoll |
| 2002/0083173 | A1 | 6/2002 | Musoll et al. |
| 2002/0124262 | A1 | 9/2002 | Basso et al. |
| 2004/0015598 | A1 | 1/2004 | Jin-Fun |
| 2004/0148382 | A1 | 7/2004 | Narad et al. |
| 2004/0172471 | A1 | 9/2004 | Porter |
| 2004/0172504 | A1 | 9/2004 | Balazich et al. |
| 2004/0213251 | A1 | 10/2004 | Tran et al. |
| 2005/0061401 | A1 | 3/2005 | Tokoro et al. |

OTHER PUBLICATIONS

Diefendorff, Keith, K7 Challenges Intel, Microprocessor Report, Oct. 26, 1998, vol. 12, No. 14, US.

U.S. Appl. No. 09/608,750, NA Nemirovsky, et al.

U.S. Appl. No. 09/602,279, NA Nemirovsky, et al.

Melvin et al., "Extended Instruction Set for a Packet Processing Applications," Jul. 5, 2001, Disclosure Document #496559, USPTO.

Musoll et al., "Hardware Algorithm for Allocating and De-Allocating Consecutive Blocks of Memory," Apr. 3, 2001, Disclosure Document #491557, USPTO.

Musoll et al., "Mechanism to Overflow Packets to a Software Controlled Memory When They Do Not Fit into a Hardware Controlled Memeory,", Jul. 3, 2001, Disclosure Document #496391, USPTO.

Musoll et al., "Mechanism for Allowing a Limited Packet Head and/or Tail Growth Without Moving the Packet to a Different Memeory Location, " Apr. 16, 2001, Disclosure Document #492429, USPTO.

Musoll et al., Mechanism to Activate a Context When No Stream is Running in a Multi-Streaming Processing Core,: Apr. 16, 2001, Disclosure Document #492431, USPTO.

Musoll, Enric, "Functional Validation of a Packet Management Unit, " May 18, 2001, Disclosure Document #429011, USPTO.

Sampath et al., "Mechanism to Un-speculatively Pre-fetch Instructions from the Thread Associated to a Packet, " Apr. 2, 2001, Disclosure Document #491527, USPTO.

Yamamoto, Wayne. An Analysis of Multistreamed, Superscalar Processor Architectures. University of California Santa Barbara Dissertation. Dec. 1995. Santa Barbara, US.

Yamamoto et al. "Increasing Superscalar Performance Through Multistreaming." Parallel Architectures and Compilation Techniques (PACT '95). 1995.

The PowerPC Architecture: A Specification for a New Family of RISC Processors. $2^{nd}$Ed. May 1994. pp. 70-72. Morgan Kaufmann. San Francisco, US.

MC68020 32-Bit Microprocessor User's Manual. $3^{rd}$Ed.. 1989. pp. 3-125, 3-126, and 3-127. Prentice Hall, NJ, US.

Potel, M. J. "Real-Time Playback in Animation Systems." Proceedings of the $4^{th}$ Annual Conference on Computer Graphics and Interactive Techniques. 1977. pp. 72-77. San Jose, CA, US.

ARM Architecture Reference Manual. 1996. pp. 3-41, 3-42, 3-43, 3-67, and 3-68. Prentice Hall, NJ, US.

ESA/390 Principles of Operation. IBM Online Publications Center Reference Number SA22-7201-08. Table of Contents and paras. 7.5.31 and 7.5.70. IBM Corporation. Boulder, CO, US.

MC88110 Second Generation RISC Microprocessor User's Manual. 1991. pp. 10-66, 10-67, and 10-71. Motorola, Inc.

Diefendorff et al. "Organization of the Motorola 88110 Superscalar RISC Microprocessor." IEEE Journal of Microelectronics. Apr. 1992. pp. 40-63. vol. 12, No. 2. IEEE. New York, NY, US.

Kane, Gerry. PA-RISC 2.0 Architecture. 1996, pp. 7-106 and 7-107. Prentice Hall. NJ, US.

Diefendorff et al. "AltiVec Extension to PowerPC Accelerates Media Processing." IEEE Journal of Microelectronics. vol. 20, No. 2(2000): pp. 85-95.

Grunewald et al. "Towards Extremely Fast Context Switching in a Block Multithreaded Processor." Proceedings of EUROMICRO 22, 1996. pp. 592-599.

Bradford et al. "Efficient Synchronization for Multithreaded Processors." Workshop on Multithreaded Execution, Architecture, and Compilation. Jan.-Feb. 1998. pp. 1-4.

Pai et al. "An Evaluation of Memory Consistency Models for Shared-Memory Systems with ILP Processors." Proceedings of ASPLOS-VII, Oct. 1996: pp. 12-23, ACM, Inc.

Yoaz et al. "Speculation Techniques for Improving Load Related Instruction Scheduling." 1999. pp. 42-53, IEEE.

Kessler, R.E. "The Alpha 21264 Microprocessor: Out-of-Order Execution at 600 MHz." Aug. 1998.

Donaldson et al. "DISC: Dynamic Instruction Stream Computer, An Evaluation of Performance." 26th Hawaii Conference on Systems Sciences. vol. 1. 1993. pp. 448-456.

Nemirovsky et al. "DISC: Dynamic Instruction Stream Computer." ACM. 1991. pp. 163-171.

Musoll et al. Mechanism to Prevent the Download of a Packet with Pending Writes Affecting Its Data. Apr. 11, 2001. Disclosure Document #492430, USTPO.

Ungerer et al. A survey of Processors with Explicit Multithreading. ACM Computing Surveys, vol., 35, No.1. Mar. 2003. pp. 29-63.

* cited by examiner

METHODS AND APPARATUS FOR MANAGING A BUFFER OF EVENTS IN THE BACKGROUND

CROSS-REFERENCE TO RELATED DOCUMENTS

The present patent application is a Continuation-In-Part of co-pending patent application entitled "Methods and Apparatus for Background Memory Management" filed on Jun. 23, 2000 and bearing Ser. No. 09/602,279. The prior application is incorporated herein in its entirety by reference.

FIELD OF THE INVENTION

The present invention is in the area of integrated circuit microprocessors, and pertains in particular to ordering the activity of a processor in response to receipt and storage of data to be processed.

BACKGROUND OF THE INVENTION

Microprocessors, as is well-known in the art, are integrated circuit (IC) devices that are enabled to execute code sequences which may be generalized as software. In the execution most microprocessors are capable of both logic and arithmetic operations, and typically modern microprocessors have on-chip resources (functional units) for such processing.

Microprocessors in their execution of software strings typically operate on data that is stored in memory. This data needs to be brought into the memory before the processing is done, and sometimes needs to be sent out to a device that needs it after its processing.

There are in the state-of-the-art two well-known mechanisms to bring data into the memory and send it out to a device when necessary. One mechanism is loading and storing the data through a sequence of Input/Output (I/O) instructions. The other is through a direct-memory access device (DMA).

In the case of a sequence of I/O instructions, the processor spends significant resources in explicitly moving data in and out of the memory. In the case of a DMA system, the processor programs an external hardware circuitry to perform the data transferring. The DMA circuitry performs all of the required memory accesses to perform the data transfer to and from the memory, and sends an acknowledgement to the processor when the transfer is completed.

In both cases of memory management in the art the processor has to explicitly perform the management of the memory, that is, to decide whether the desired data structure fits into the available memory space or does not, and where in the memory to store the data. To make such decisions the processor needs to keep track of the regions of memory wherein useful data is stored, and regions that are free (available for data storage). Once that data is processed, and sent out to another device or location, the region of memory formerly associated with the data is free to be used again by new data to be brought into memory. If a data structure fits into the available memory, the processor needs to decide where the data structure will be stored. Also, depending on the requirements of the processing, the data structure can be stored either consecutively, in which case the data structure must occupy one of the empty regions of memory; or non-consecutively, wherein the data structure may be partitioned into pieces, and the pieces are then stored into two or more empty regions of memory.

An advantage of consecutively storing a data structure into memory is that the accessing of this data becomes easier, since only a pointer to the beginning of the data is needed to access all the data.

When data is not consecutively stored into the memory, access to the data becomes more difficult because the processor needs to determine the explicit locations of the specific bytes it needs. This can be done either in software (i.e. the processor will spend its resources to do this task) or in hardware (using a special circuitry). A drawback of consecutively storing the data into memory is that memory fragmentation occurs. Memory fragmentation happens when the available chunks of memory are smaller than the data structure that needs to be stored, but the addition of the space of the available chunks is larger than the space needed by the data structure. Thus, even though enough space exists in the memory to store the data structure, it cannot be consecutively stored. This drawback does not exist if the data structure is allowed to be non-consecutively stored.

Still, a smart mechanism is needed to generate the lowest number of small regions, since the larger the number of small regions that are used by a data structure, the more complex the access to the data becomes (more specific regions need to be tracked) regardless of whether the access is managed in software or hardware as explained above.

A related problem in processing data is in the establishment of an order of processing in response to an order of receiving data to be processed. In many cases, data may be received and stored faster than a processor can process the data, and there is often good reason for processing data in an order different from the order in which the data is received. In the current art, for a processor to take priorities into account in the order in which it processes data, the processor has to expend resources on checking the nature of the data (priorities) and in re-ordering the sequence in which it will process the data.

What is clearly needed is a background system for tracking data receipt and storage for a processor system, and for ordering events for the processor.

SUMMARY OF THE INVENTION

In a preferred embodiment of the present invention, a background event buffer manager (BEBM) for ordering and accounting for events in a data processing system having a processor is provided, the BEBM comprising a port for receiving event identifications (IDs) from a device; a queuing function enabled for queuing event IDs received; and a notification function for notifying the processor of queued event IDs. The BEBM handles all event ordering and accounting for the processor.

In preferred embodiments the queuing function queues event IDs by type, and by event priority within type queues, and also associates an acknowledgment (ack) with each event. The ack may have multiple states, and acks for events first queued are set in a "processor unaware" state. Also, after notification to the processor the ack state for the queued event is changed to a state of "processor aware".

In some embodiments there is further a function for receiving notification from the processor of processing completed on an event, and wherein, upon receiving such a notification the state of the ack for the event is changed to "ready". There may further be a function for sending acks in ready state back to the device that originally sent the event associated with the ack, and for buffering the process of sending the acks.

In preferred embodiments the processor is notified of events in order of type priority first, and then by event priority within type. Also in preferred embodiments, the events may be arrival of packets to be processed in a network packet router.

In another aspect of the invention a data processing system is provided, comprising a processor; a memory coupled to the processor; and a background event buffer manager BEBM coupled to the processor, the BEBM including a port for receiving event identifications (IDs) from a device, a queuing function enabled for queuing event IDs received, and a notification function for notifying the processor of queued event IDs. The system is characterized in that the BEBM handles all event ordering and accounting for the processor.

In the data processing system the queuing function, in preferred embodiments, queues event IDs by type, and by event priority within type queues, and also associates an acknowledgment (ack) with each event.

In some embodiments the ack may have multiple states, and acks for events first queued are set in a "processor unaware" state. After notification to the processor the ack state for the queued event may be changed to a state of "processor aware". In some embodiments there is also a function for receiving notification from the processor of processing completed on an event, and wherein, upon receiving such a notification the state of the ack for the event is changed to "ready". Also in some embodiments there is a function for sending acks in ready state back to the device that originally sent the event associated with the ack, and for buffering the process of sending the acks.

In preferred embodiments of the data processing system the processor is notified of events in order of type priority first, and then by event priority within type. In some embodiments the events are arrival of packets to be processed in a network packet router, and the system is a packet processing engine.

In yet another aspect of the invention a network packet router is provided, comprising an input/output (I/O) device for receiving and sending packets on the network, a processor, a memory coupled to the processor, and a background event buffer manager BEBM coupled to the processor, the BEBM including a port for receiving event identifications (IDs) of arriving packets from the I/O device, a queuing function enabled for queuing packet IDs received, and a notification function for notifying the processor of queued packet IDs for processing. The router is characterized in that the BEBM handles all event ordering and accounting for the processor.

In preferred embodiments of the router the queuing function queues event IDs by type, and by event priority within type queues, and also associates an acknowledgment (ack) with each event. The ack may have multiple states, and acks for events first queued are set in a "processor unaware" state. After notification to the processor the ack state for the queued event may be changed to a state of "processor aware".

In some embodiments of the router there is a function for receiving notification from the processor of processing completed on an event, and wherein, upon receiving such a notification the state of the ack for the event is changed to "ready". There may further be a function for sending acks in ready state back to the device that originally sent the event associated with the ack, and for buffering the process of sending the acks. In preferred embodiments of the router the processor is notified of events in order of type priority first, and then by event priority within type.

In yet another aspect of the invention a method for ordering and accounting for events in a data processing system having a processor is provided, the method comprising steps of (a) generating event identifications (IDs) by a device; (b) sending the event IDs to a background event buffering manager (BEBM) by the device; (c) queuing event IDs received by the BEBM; and (d) notifying the processor by the BEBM of events queued for processing, such that the BEBM handles all event ordering and accounting for the processor.

In preferred embodiments of the method, in step (c), event IDs are queued by type, and by event priority within type queues, and an acknowledgment (ack) is associated with each event. Also in preferred embodiments the ack may have multiple states, and acks for events first queued are set in a "processor unaware" state. After notification to the processor the ack state for the queued event may be changed to a state of "processor aware".

In some embodiments of the method there is a further step for receiving, at the BEBM, notification from the processor of processing completed on an event, and wherein, upon receiving such a notification the state of the ack for the event is changed to "ready". Also in some embodiments there is a step for sending acks in ready state back to the device that originally sent the event associated with the ack, and for buffering the process of sending the acks. The processor may be notified of events in order of type priority first, and then by event priority within type.

In embodiments of the invention taught in enabling detail below, for the first time a background event buffer manager is provided for processing systems, so events for processing may be queued by priority ahead of the processor, and all accounting for events may be handled with a minimum of activity by the processor itself.

BRIEF DESCRIPTION OF THE DRAWING FIGURES

DESCRIPTION OF THE PREFERRED EMBODIMENTS

Figure 1:
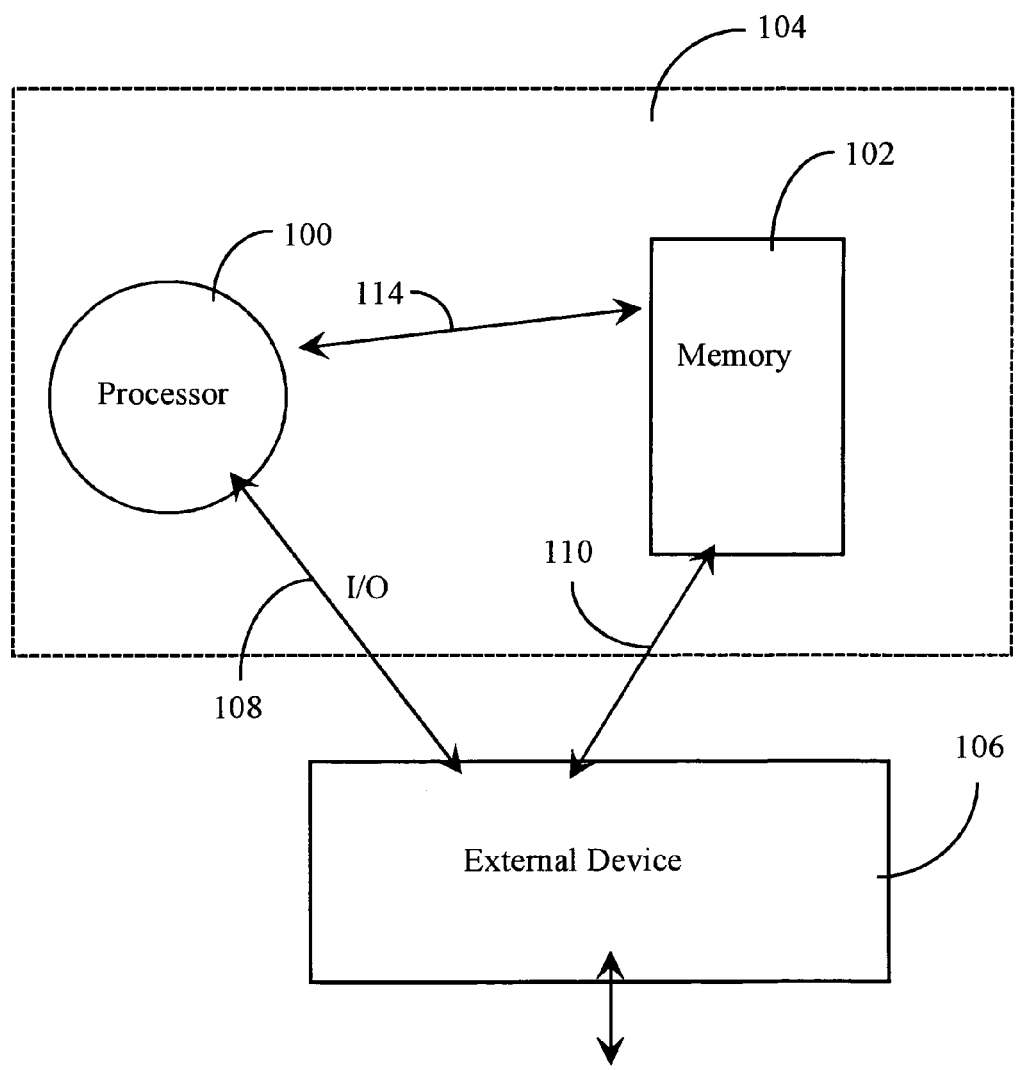
FIG. 1 is a simplified diagram of memory management by direct I/O processing in the prior art.

FIG. 1 is a simplified diagram of memory management in a system 104 comprising a processor 100 and a memory 102 in communication with a device 106. In this example it is necessary to bring data from device 106 into memory 102 for processing, and sometimes to transmit processed data from memory 102 to device 106, if necessary. Management in this prior art example is by processor 100, which sends I/O commands to and receives responses and/or interrupts from device 106 via path 108 to manage movement of data between device 106 and memory 102 by path 110. The processor has to determine whether a data structure can fit into available space in memory, and has to decide where in the memory to store incoming data structures. Processor 100 has to fully map and track memory blocks into and out of memory 102, and retrieves data for processing and stores results, when necessary, back to memory 102 via path 114. This memory management by I/O commands is very slow and cumbersome and uses processor resources quite liberally.

Figure 2:
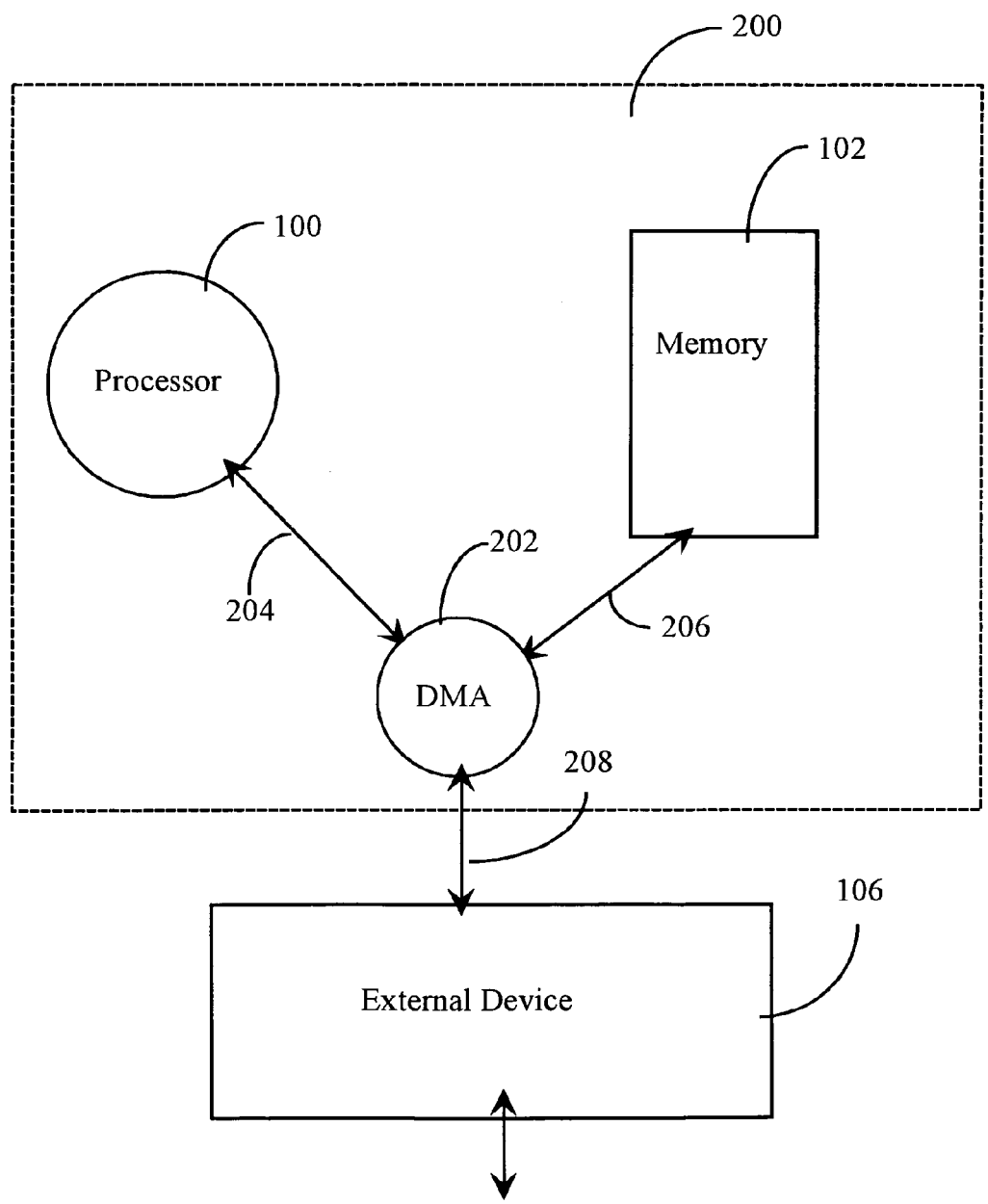
FIG. 2 is a simplified diagram of memory management by direct memory access in the prior art.

FIG. 2 is a simplified diagram of a processor system 200 in the prior art comprising a processor 100, a memory 102 and a direct memory access (DMA) device 202. This is the second of two systems by which data, in the conventional art, is brought into a system, processed, and sent out again, the first of which is by I/O operations as described just above. System 200 comprises a DMA device 202 which has built-in intelligence, which may be programmed by processor 100, for managing data transfers to and from memory 102. DMA device 202 is capable of compatible communication with external device 106, and of moving blocks of data between device 102 and 106, bi-directionally. The actual data transfers are handled by DMA device 202 transparently to processor 100, but processor 100 must still perform the memory mapping tasks, to know which regions of memory are occupied with data that must not be corrupted, and which regions are free to be occupied (overwritten) by new data.

In the system of FIG. 2 DMA processor 100 programs DMA device 202. This control communication takes place over path 204. DMA device 202 retrieves and transmits data to and from device 106 by path 208, and handles data transfers between memory 102 and processor 100 over paths 204 and 206.

In these descriptions of prior art the skilled artisan will recognize that paths 204, 206 and 208 are virtual representations, and that actual data transmission may be by various physical means known in the art, such as by parallel and serial bus structures operated by bus managers and the like, the bus structures interconnecting the elements and devices shown.

Figure 3:
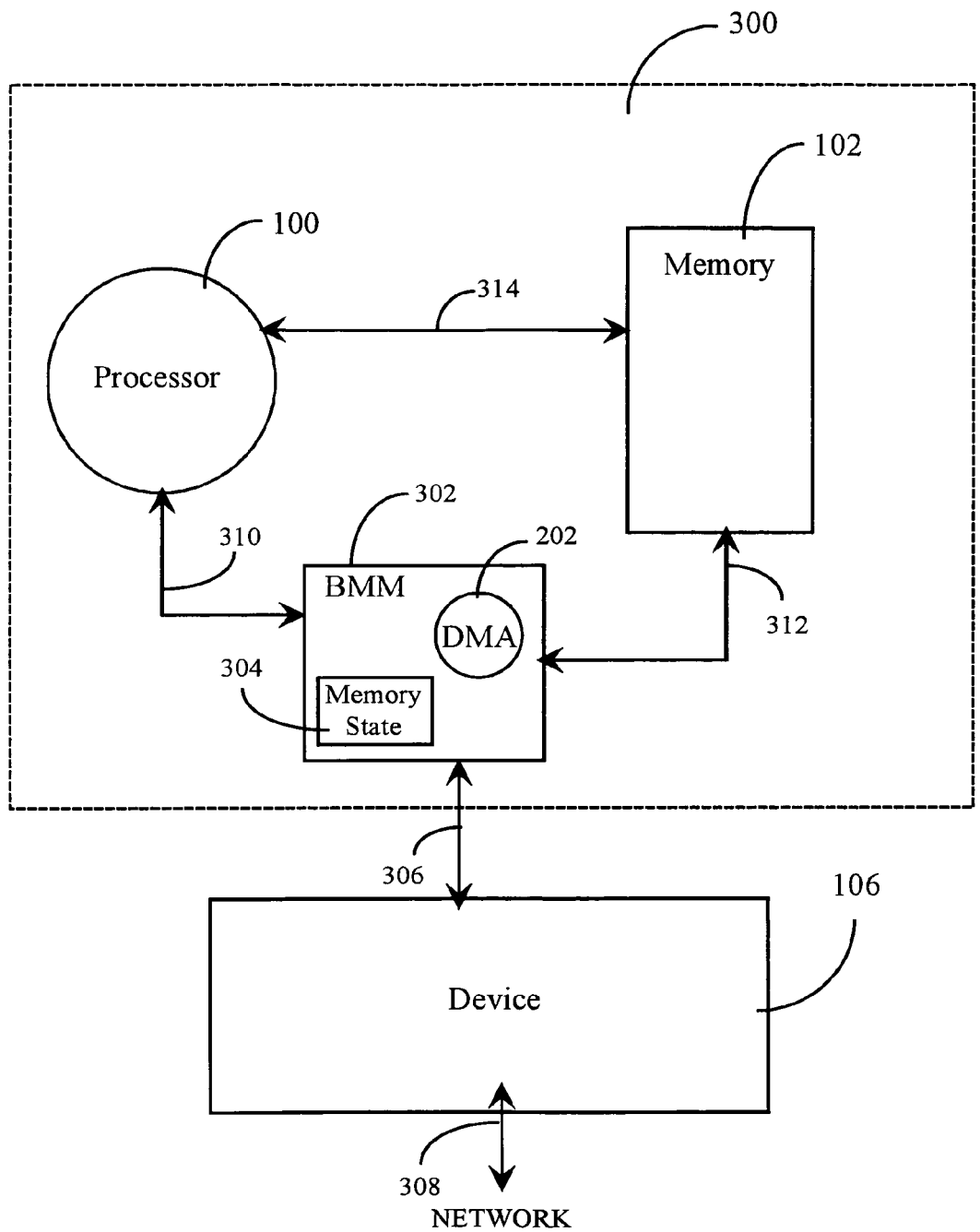
FIG. 3 is a diagram of memory management by a Background Memory Manager in a preferred embodiment of the present invention.

FIG. 3 is a schematic diagram of a system 300 including a Background Memory Manager (BMM) 302 according to an embodiment of the present invention. BMM 302 a hardware mechanism enabled to manage the memory in the background, i.e. with no intervention of the processor to decide where the data structure will be stored in the memory. Thus, the processor can utilize its resources for tasks other than to manage the memory.

The present invention in several embodiments is applicable in a general way to many computing process and apparatus. For example, in a preferred embodiment the invention is applicable and advantageous in the processing of data packets at network nodes, such as in packet routers in the Internet. The packet processing example is used below as a specific example of practice of the present invention to specifically describe apparatus, connectivity and functionality.

In the embodiment of a packet router, device 106 represents input/output apparatus and temporary storage of packets received from and transmitted on a network over path 308. The network in one preferred embodiment is the well-known Internet network. Packets received from the Internet in this example are retrieved from device 106 by BMM 302, which also determines whether packets can fit into available regions in memory and exactly where to store each packet, and stores the packets in memory 102, where they are available to processor 100 for processing. Processor 100 places results of processing back in memory 102, where the processed packets are retrieved, if necessary, by BMM on path 312 and sent back out through device 106.

In the embodiment of FIG. 3 BMM 302 comprises a DMA 202 and also a memory state map 304. BMM 302 also comprises an interrupt handler in a preferred embodiment, and device 106 interrupts BMM 302 when a packet is received. When a packet is received, using DMA 202 and state map 304, the BMM performs the following tasks:

1. Decides whether a data structure fits into the memory. Whether the structure fits into memory, then, is a function of the size of the data packet and the present state of map 304, which indicates those regions of memory 102 that are available for new data to be stored.
2. If the incoming packet in step 1 above fits into memory, the BMM determines an optimal storage position. It was described above that there are advantages in sequential storage. Because of this, the BMM in a preferred embodiment stores packets into memory 102 in a manner to create a small number of large available regions, rather than a larger number of smaller available regions.
3. BMM 302 notifies processor 100 on path 310 when enough of the packet is stored, so that the processor can begin to perform the desired processing. An identifier for this structure is created and provided to the processor. The identifier communicates at a minimum the starting address of the packet in memory, and in some cases includes additional information.
4. BMM updates map 304 for all changes in the topology of the memory. This updating can be done in any of several ways, such as periodically, or every time a unit in memory is changed.
5. When processing is complete on a packet the BMM has stored in memory 102, the processor notifies BMM 302, which then transfers the processed data back to device 106. This is for the particular example of a packet processing task. In some other embodiments data may be read out of memory 102 by MM 302 and sent to different devices, or even discarded. In notifying the BMM of processed data, the processor used the data structure identifier previously sent by the BMM upon storage of the data in memory 102.
6. The BMM updates map 304 again, and every time it causes a change in the state of memory 102. Specifically the BMM de-allocates the region or regions of memory previously allocated to the data structure and sets them as available for storage of other data structures, in this case packets.

In another aspect of the invention methods and apparatus are provided for ordering events for a processor other than the order in which data might be received to be processed, and without expenditure of significant processor resources.

In the teachings above relative to background memory management an example of packet routing in networks such as the Internet was used extensively. The same example of Internet packet traffic is particularly useful in the present aspect of event managing for a processor, and is therefore continued in the present teaching.

Figure 4:
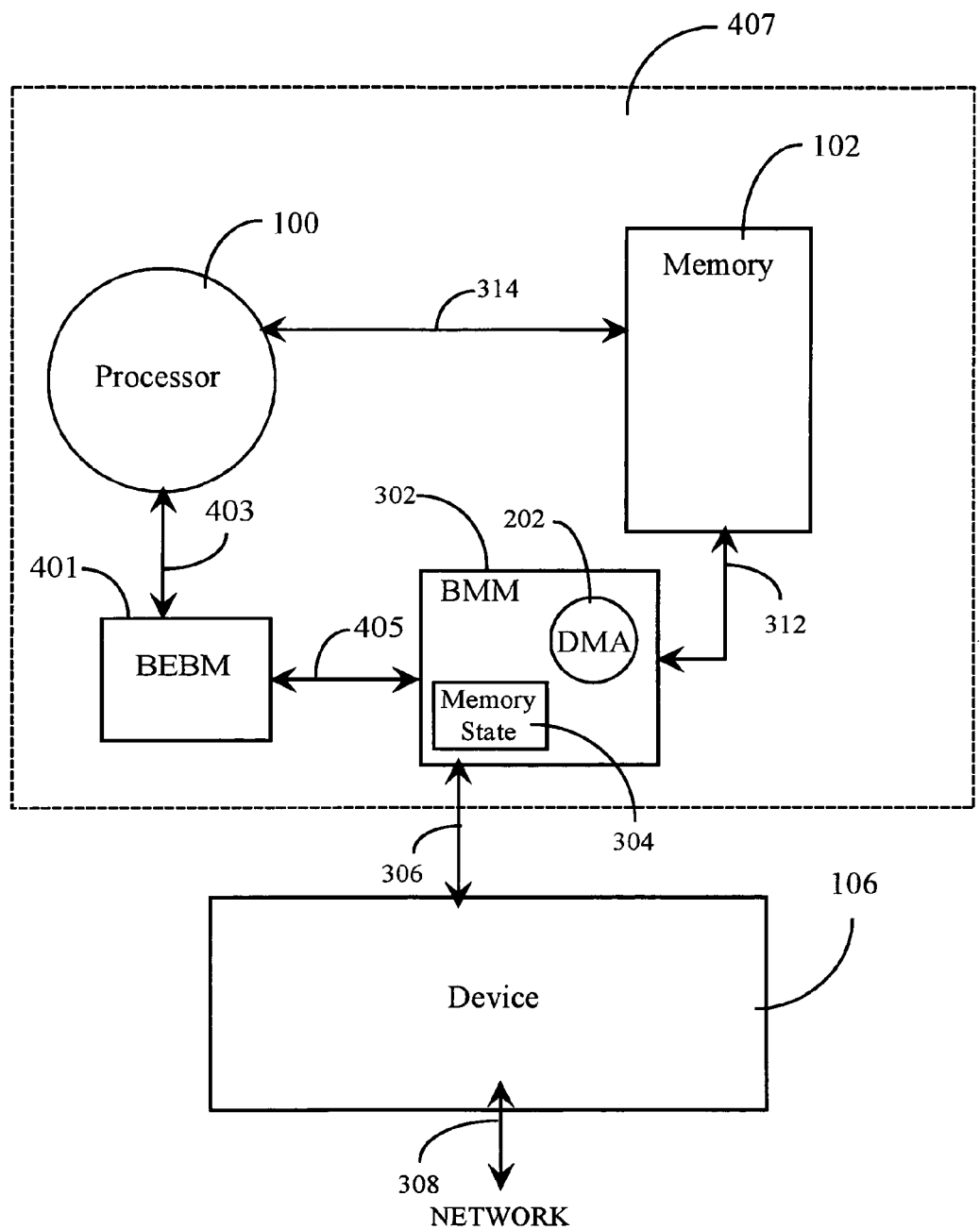
FIG. 4 is a diagram of ordering of events for a processor by a Background Event Manager (BEBM) according to an embodiment of the present invention.

FIG. 4 is a system diagram illustrating a system 407 using a Background Event Buffer Manager (BEBM) 401 according to an embodiment of the present invention. In this embodiment BEBM 401 works in conjunction with BMM 302 described in enabling detail above. Further, for purposes of illustration and description, it is assumed that system 407 in FIG. 4 is a system operating in a packet router, and the network to which device 106 connects by link 308 is the well-known Internet network.

In a communication session established over the Internet between any two sites there will be an exchange of a large number of packets. For the purpose of the present discussion we need to consider only flow of packets in one direction, for which we may select either of the two sites as the source and the other as the destination. In this example packets are generated by the source, and received at the destination. It is important that the packets be received at the destination in the same order as they are generated and transmitted at the source, and, if the source and destination machines were the only two machines involved with the packet flow, and all packets in the flow were to travel by the same path, there would be no problem. Packets would necessarily arrive in the order sent.

Unfortunately packets from a source to a destination may flow through a number of machines and systems on the way from source to destination, and there are numerous opportunities for packets to get disordered. Moreover, the machines handling packets at many places in the Internet are dealing with large numbers of sources and destinations, and therefore with a large number of separate packet flows, which are termed microflows in the art. It will be apparent to the skilled artisan that packets from many different microflows may be handled by a single router, and the packets may well be intermixed while the packets for each separate microflow are still in order. That is, packets from one microflow may be processed, then packets from a second and third microflow, and then more packets from the first microflow, while if only packets from one microflow are considered the flow is sequential and orderly.

The problems that can occur if microflows are allowed to be disordered are quite obvious. If a particular microflow is for an Internet telephone conversation, for example, and the flow gets out-of-order the audio rendering may be seriously affected. Systems for Internet communication are, of course, provided in the art with re-ordering systems for detecting disordered microflows, and re-ordering the packets at the destination, but such systems require a considerable expenditure of processing resources, and, in some cases, packets may be lost or discarded.

It will also be apparent to the skilled artisan that packets from a source to a destination typically pass through and are processed by a number of different machines along the way from source to destination. System 407 illustrated in FIG. 4 is meant to represent one such system through which packets may pass and be processed, and such systems include source and end nodes as well. It should be apparent, then, that, since packets originate in a specific order at a source site, they will highly likely be received in that order at a first destination, and that therefore a reasonable goal at any router will be to always process and retransmit packets from a router in the same order that the packets were received for a specific microflow.

Referring now to FIG. 3, which is the system of FIG. 4 without the BEBM of the present invention, it was described above that Background Memory Manager (BMM) 302 handles all memory state accounting and moves all data, in this example packets, into and out of memory 102. In that procedure the processor is informed by the BMM via path 310, as an interrupt, when a packet from device 106 is stored in memory 102. When the processor has processed a packet, device 106 must be notified, which is done through BMM 302.

Now, it is well known that packets are not necessarily received in a steady flow, but may be received in bursts. Still, BMM 302 in the case of the system of FIG. 3, or processor 100 in the case of most prior art systems, is interrupted for each packet. It may be that when the processor is interrupted for packets arriving that the processor is busy on other tasks. Interrupts may arrive in bursts much faster than the processor can handle them. In this case the processor has to keep track of all of the events and order the processing of all events.

In a somewhat more general sense the process just described, sans BEBM, can be described as follows:

In some applications a processor needs to perform some kind of processing when an event generated by a device occurs, and it has to notify that device when the processing of the event is completed (henceforth this notification is named ack, for acknowledge).

An event e generated by a device may have associated a type of a priority p (henceforth named type priority). Within a type priority, events can have different priorities q (henceforth named event priority). The device may generate the events in any order. However, it may impose some restrictions on the ordering of the corresponding acks. A reason why this can happen is because the device may not know the type priority nor the event priority of the event it generates, and therefore it relies on the processing of the events to figure out the type and/or event priorities. Thus, it may request the acks of the highest priority events to be received first.

More specifically, let Gen(e) be the time when event e was generated by the device; Gen(e1)<Gen(e2) indicates that event e1 was generated before than event e2. Let Ack(e) be the time when the ack is generated for event e by the processor; Ack(e1)<Ack(e2) indicates that the ack for event e1 was generated before the ack for event e2. Let e(p) and e(q) be the type priority and event priority, respectively, of event e.

The following are examples of restrictions that the device can impose on the ordering of the acks generated by the processor. The device might request, for example, that (a) Ack(e1)<Ack(e2) when Gen(e1)<Gen(e2)

Acks are generated in the same order that the corresponding events occurred, independently on the type and event priority of the events.

(b) Gen(e1)<Gen(e2) AND e1(p) e2(p)

Acks for the events of the same type priority are generated in the same order that the events where generated;

(c) e1(p)>e2(p)

Acks for the events with highest event priority (that the processor is currently aware of) are generated first.

(d) e1(q)>e2(q).

Acks for the events of the highest type priority (of which the processor is currently aware) are generated first.

(e) e1(q)>e2(q) AND e1(p)>e2(p)

Acks for the events with highest event priority in the highest type priority (of which the processor is currently aware) are generated first.

In any case, the goal of the processor is to generate the acks as soon as possible to increase the throughput of processed events. The processor can dedicate its resources to guarantee the generation of acks following the restrictions mentioned above. However, the amount of time the processor dedicates to this task can be significant, thus diminishing the performance of the processor on the processing of the events. Moreover, depending on how frequent these events occur, and the amount of processing that each event takes, the processor will not be able to start processing them at the time they occur. Therefore, the processor will need to buffer the events and process them later on.

The skilled artisan will surely recognize that the ordering of and accounting for events, as described herein, is a considerable and significant processor load.

In preferred embodiments of the present invention, managing of the ordering of the acks is implemented in hardware and is accomplished in the background (i.e. while the processor is performing the processing of other events).

The system at the heart of embodiments of the present invention is called by the inventors a Background Event Buffer Manager (BEBM), and this is element 401 in FIG. 4. Note that in FIG. 4 the BEBM is implemented in system 407 with the inventive BMM 302, which is described in enabling detail above. It is not a restriction on the implementation of BEBM 401 that it only perform with a BMM in a system, but it is a convenience adding further advantages in a processing system.

The BEBM performs the following tasks:
1. The BEBM buffers, completely in the background, all incoming events. If proper information is available (like the type priority and event priority described above), the buffering of an event will be done so that its ack happens as soon as possible under the restrictions in task 4, below. In other words, the BEBM will take advantage of any information about the event that the device can generate. In some cases the device may generate events without an associated priority.
2. The BEBM notifies the processor about any event that has been buffered and for which the processor does not know of its existence. Similarly as in task 1, if the proper information is available (like the type priority and event priority), these notifications will be generated so that the ack happens as soon as possible under the restrictions in task 4. The processor will typically follow the priorities, if notified, but may, under certain conditions override or change the priority of an event.
3. The BEBM updates the status (further description below) of the ack for a particular event based on the result of the processing of the event by the processor,
4. The BEBM guarantees any of the restrictions imposed on the generation of the acks with minimal intervention of the processor.

When an event is buffered in the BEBM (task 1), its corresponding ack, also buffered with the event, is in the processor-not-aware state, meaning that the processor still has no knowledge of this event and, therefore, it still has to start processing it. When the event is presented to the processor (task 2), its ack state transitions into processor-aware, meaning that the processor has started the processing of the event but it still has not finished. When the processor finishes this processing, it notifies the BEBM about this fact and the state of the ack becomes ready.

At this point, the ack becomes a candidate to be sent out to the device. When the ack state becomes processor-aware, the associated information to the event (type priority and event priority) may be provided to the processor or not, depending on whether the device that generated the event also generated this information or not. The processor can figure out this information during the processing of the event, and override the information sent by the device, if needed. This information can potentially be sent to the BEBM though some communication mechanism. The BEBM records this information, which is used to guarantee task 4.

In case the processor does not communicate this information to the BEBM, the original information provided by the device, if any, or some default information will be used to guarantee task 4. In any case, the processor always needs to communicate when the processing of an event has completed.

When the processor finishes processing an event the state of the ack associated with the event ID is changed to "ready", as previously described. The BEBM also buffers the transmission of acks back to the device that generated the events, because the device may be busy with other tasks. As the device becomes capable of processing the acks, the BEBM sends them to the device.

Figure 5:
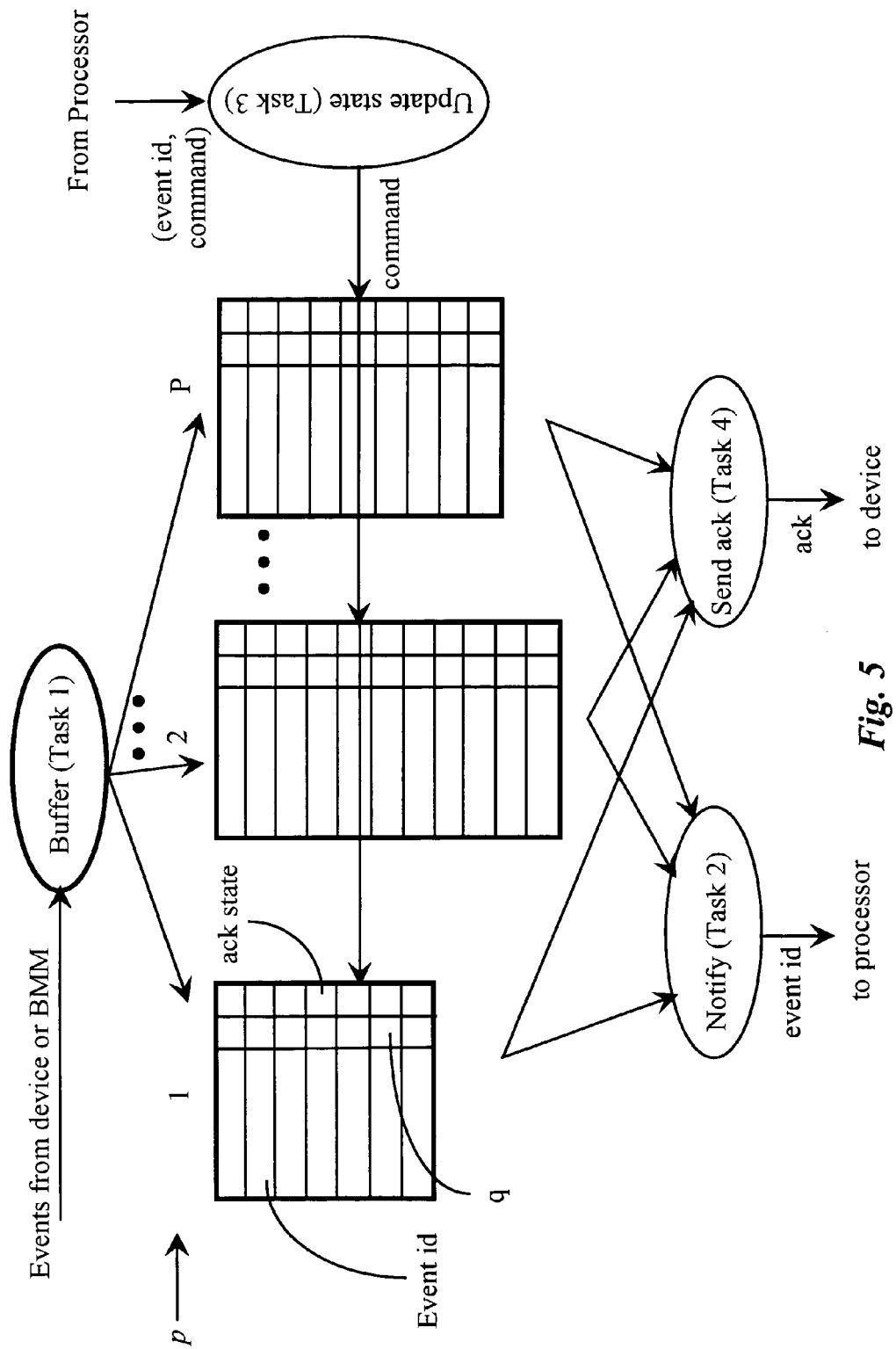
FIG. 5 is a high-level diagram of queues and functions for a background event buffer manager according to an embodiment of the present invention.

FIG. 5 is a high-level diagram of a BEBM according to an embodiment of the present invention. The squares represent the buffering and queuing part of the BEBM and the ellipses represent the different tasks 1–4 described above.

Ideally, the buffering function of the BEBM is divided into as many queues (blocks) as different types of priorities exist, and each block has as many entries as needed to buffer all the events that might be encountered, which may be determined by the nature of the hardware and application. In the instant example three queues are shown, labeled 1, 2 and P, to represent an indeterminate number. In a particular implementation of the BEBM, however, the amount of buffering will be limited and, therefore several priority types might share the same block, and/or a block might get full, so no more events will be accepted. This limitation will affect how fast the acks are generated but it will not affect task 4.

In the context of the primary example in this specification, that of a packet processing engine, the data structures provided by device 106 are network packets, and the events are therefore the fact of receipt of new packets to be processed. There will typically be packets of different types, which may have type priorities, and within types there may also be event priorities. The BEBM therefore maintains queues for different packet types, and offers the queues to the processor by priority; and also orders the packets in each type queue by priority (which may be simply the order received).

In the instant example, referring now to FIG. 4, the events come from the BMM to task 1, the processor is notified by event id (task 2) by the BEBM, and the processor, having processed a packet sends a command to update the ack associated with the event id. The BEBM then sends the updated ack (task 4) to the BMM, which performs necessary memory transfers and memory state updates.

It will be apparent to the skilled artisan that there may be many alterations in the embodiments described above without departing from the spirit and scope of the present invention. For example, a specific case of operations in a data packet router has been illustrated. This is a single instance of a system wherein the invention may provide significant advantages. There are many other systems and processes that will benefit as well. Further, there are a number of ways a BEBM and BMM may be implemented, either alone of together, to perform the functionality described above, and there are many systems incorporating many different kinds of processors that might benefit. The present inventors are particularly interested in a system wherein a dynamic multi-streaming processor performs the functions of processor 100. For these and other reasons the invention should be limited only by the scope of the claims below.

What is claimed is:

1. A background event buffer manager (BEBM) for ordering and accounting for events in a data processing system having a processor, the BEBM comprising:
    a port for receiving event identifications (IDs) from a device;
    a queuing function enabled for queuing event IDs received; and
    a notification function for notifying the processor of queued event IDs; wherein the BEBM handles ordering and accounting for the processor;

wherein the queuing function queues event IDs by type, and by event priority within type queues, and also associates an acknowledgment (ack) with each event; and wherein the ack has multiple states, and acks for events first queued are set in a processor unaware state.

2. The BEBM of claim 1 wherein, after notification to the processor the ack state for the queued event is changed to a state of processor"aware.

3. The BEBM of claim 2 comprising a function for receiving notification from the processor of processing completed on an event, and wherein, upon receiving such a notification the state of the ack for the event is changed to ready.

4. The BEBM of claim 3 further comprising a function for sending acks in ready state back to the device that originally sent the event associated with the ack, and buffering the process of sending the acks.

5. The BEBM of claim 1 wherein the processor is notified of events in order of type priority first, and then by event priority within type.

6. The BEBM of claim 1 wherein the events are arrival of packets to be processed in a network packet router.

7. A data processing system, comprising:
a processor;
a memory coupled to the processor; and
a background event buffer manager BEBM coupled to the processor, the BEBM including a port for receiving event identifications (IDs) from a device, a queuing function enabled for queuing event IDs received, and a notification function for notifying the processor of queued event IDs;
wherein the BEBM handles event ordering and accounting for the processors
wherein the queuing function queues event IDs by type, and by even priority within type queues, and also associates an acknowledgement (ack) with each event; and
wherein the ack has multiple states, and acks for events first queued are set in a processor unaware state.

8. The data processing system of claim 7 wherein, after notification to the processor the ack state for the queued event is changed to a state of processor aware.

9. The data processing system of claim 8 comprising a function for receiving notification from the processor of processing completed on an event, and wherein, upon receiving such a notification the state of ack for the event is changed to ready.

10. The data processing system of claim 9 further comprising a function for sending acks in a ready state back to the device that originally sent the event associated with the ack, and for buffering the sending process.

11. The data processing system of claim 7 wherein the processor is notified of events in order of type priority first, and then by event priority within type.

12. The data processing system of claim 7 wherein the events are arrival of packets to be processed in a network packet router, and the system is a packet processing engine.

13. A network packet router, comprising:
an input/output (I/O) device for receiving and sending packets on the network;
a processor;
a memory coupled to the processor; and
a background event buffer manager BEBM coupled to the processor, the BEBM including a port for receiving event identifications (IDs) of arriving packets from the I/O device, a queuing function enabled for queuing event identifications IDs received, and a notification function for notifying the processor of queued event identifications IDs for processing;
wherein the BEBM handles event ordering and account for the processors;
wherein the queuing function queues event IDs by type, and by event priority within type queues, and also associates an acknowledgement (ack) with each event; and
wherein the ack has multiple states, and acks for events first queued are set in a processor unaware state.

14. The network packet router of claim 13 wherein, after notification to the processor the ack state for the queued event is changed to a state of processor aware.

15. The network packet router of claim 14 comprising a function for receiving notification from the processor of processing completed on an event, and wherein, upon receiving such a notification the state of the ack for the event is changed to ready.

16. The network packet router of claim 15 further comprising a function for sending acks in a ready state back to the device that originally sent the event associated with the ack, and for buffering the sending process.

17. The network packet router of claim 13 wherein the processor is notified of events in order of type priority first, and then by event priority within type.

18. The network packet router of claim 13 wherein the events are arrival of packets to be processed in a network packet router, and the system is a packet processing engine.

19. A method for ordering and accounting for events in a data processing system having a processor, the method comprising steps of:
(a) generating event identifications (IDs) by a device;
(b) sending the event IDs to a background event buffering manager (BEBM) by the device;
(c) queuing event IDs received by the BEBM; and
(d) notifying the processor by the BEBM of events queued for processing, such that the BEBM handles all event ordering and accounting for the processors;
wherein, in step (c), event IDs are queued by type, and by event priority within type queues, and an acknowledgement (ack) is associated with each event; and
wherein in step (c), event IDs are queued by type, and by event priority within type queues, and an acknowledgement (ack) is associated with each event.

20. The method of claim 19 wherein, after notification to the processor the ack state for the queued event is changed to a state of processor aware.

21. The method of claim 20 comprising a further step for receiving, at the BEBM, notification from the processor of processing completed on an event, and wherein, upon receiving such a notification the state of the ack for the event is changed to ready.

22. The method of claim 21 further comprising a step of sending acks in a ready state back to the device that originally sent the event associated with the ack, and for buffering the sending process.

23. The method of claim 19 wherein the processor is notified of events in order of type priority first, and then by event priority within type.

24. The method of claim 19 wherein the events are arrival of packets to be processed in a network packet router, and the system is a packet processing engine.

* * * * *